United States Patent
Akashika et al.

(10) Patent No.: US 10,262,361 B2
(45) Date of Patent: Apr. 16, 2019

(54) ELECTRONIC MONEY SERVER, ELECTRONIC MONEY PROCESSING METHOD, ELECTRONIC MONEY PROCESSING PROGRAM PRODUCT, AND STORAGE MEDIUM ON WHICH ELECTRONIC MONEY PROCESSING PROGRAM PRODUCT IS STORED

(71) Applicant: RAKUTEN, INC., Shinagawa-ku, Tokyo (JP)

(72) Inventors: Hideki Akashika, Shinagawa-ku (JP); Norio Nakamura, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 566 days.

(21) Appl. No.: 14/369,603

(22) PCT Filed: Dec. 27, 2012

(86) PCT No.: PCT/JP2012/083885
§ 371 (c)(1),
(2) Date: Jun. 27, 2014

(87) PCT Pub. No.: WO2013/100056
PCT Pub. Date: Jul. 4, 2013

(65) Prior Publication Data
US 2015/0012414 A1 Jan. 8, 2015

(30) Foreign Application Priority Data
Dec. 28, 2011 (JP) .................. 2011-290181

(51) Int. Cl.
*G06Q 40/04* (2012.01)
*G06Q 40/02* (2012.01)
(Continued)

(52) U.S. Cl.
CPC ....... *G06Q 40/025* (2013.01); *G06Q 20/0655* (2013.01); *G06Q 20/102* (2013.01);
(Continued)

(58) Field of Classification Search
CPC ................................ G06Q 40/04
(Continued)

(56) References Cited

U.S. PATENT DOCUMENTS 8,060,413 B2 * 11/2011 Castell ................ G06Q 20/105
705/26.1
2001/0037311 A1 * 11/2001 McCoy ............. G06F 17/30206
705/65
(Continued)

FOREIGN PATENT DOCUMENTS

JP    WO 02101617 A1 * 12/2002 ............. G06Q 20/04
JP    2003-187159 A      7/2003
(Continued)

OTHER PUBLICATIONS

"bitWallet, Inc Files Patent Application for Mobile Terminal Device, Mobile Terminal Method, Mobile Terminal Program, Providing Sever Device, Providing Server Method, and Providing Server Program" Pub. Indian Patents News [New Delhi. Jan. 7, 2011.*
(Continued)

*Primary Examiner* — Sara C Hamilton
(74) *Attorney, Agent, or Firm* — Sughrue Mion, PLLC

(57) ABSTRACT

The purpose of the present invention is to provide an electronic money server that supports regular periodic payments using electronic money. On the electronic money server, a payment debt is created in association with an electronic money function section ID. A "transaction ID" is also determined at that time. An electronic money application on a portable terminal sends the electronic money server a payment debt request to ascertain whether or not a pay-
(Continued)

ment debt exists. If a payment debt exists and the due date thereof has been reached, the electronic money server sends the portable terminal a payment connection request and requests authorization from the user. If the user sends an "approval" notification to the electronic money server, the electronic money server sends a payment request by sending a subtraction command to a IC chip in the portable terminal.

19 Claims, 7 Drawing Sheets

(51) Int. Cl.
  *G06Q 20/06* (2012.01)
  *G06Q 20/20* (2012.01)
  *G06Q 20/32* (2012.01)
  *G06Q 20/10* (2012.01)
  *G06Q 20/36* (2012.01)
  *G06Q 20/40* (2012.01)
(52) U.S. Cl.
  CPC ............. *G06Q 20/20* (2013.01); *G06Q 20/32* (2013.01); *G06Q 20/3678* (2013.01); *G06Q 20/40* (2013.01)
(58) Field of Classification Search
  USPC .......................................................... 705/37
  See application file for complete search history.

(56) References Cited

U.S. PATENT DOCUMENTS

| | | | | |
|---|---|---|---|---|
| 2002/0130175 A1* | 9/2002 | Nakajima | ............... | G06Q 20/04 235/379 |
| 2004/0044627 A1* | 3/2004 | Russell | .................. | G06Q 20/00 705/50 |
| 2004/0117301 A1* | 6/2004 | Fujisawa | ................ | G06Q 20/04 705/39 |
| 2004/0127256 A1* | 7/2004 | Goldthwaite | ........ | G06K 7/0004 455/558 |
| 2006/0116892 A1* | 6/2006 | Grimes | .................. | G06Q 10/02 705/5 |
| 2007/0215697 A1* | 9/2007 | Ward | ..................... | G06Q 20/10 235/380 |
| 2007/0233615 A1* | 10/2007 | Tumminaro | ........... | G06Q 20/12 705/75 |
| 2007/0244811 A1* | 10/2007 | Tumminaro | ........... | G06Q 20/10 705/39 |
| 2007/0255653 A1* | 11/2007 | Tumminaro | ........... | G06Q 20/10 705/39 |
| 2008/0006685 A1* | 1/2008 | Rackley, III | ........... | G06Q 20/10 235/379 |
| 2008/0010190 A1* | 1/2008 | Rackley, III | ........ | G06Q 20/042 705/39 |
| 2008/0010191 A1* | 1/2008 | Rackley, III | ........ | G06Q 20/042 705/39 |
| 2008/0010192 A1* | 1/2008 | Rackley, III | ........ | G06Q 20/042 705/39 |
| 2008/0010193 A1* | 1/2008 | Rackley, III | ........ | G06Q 20/042 705/39 |
| 2008/0010196 A1* | 1/2008 | Rackley, III | ........ | G06Q 20/102 705/40 |
| 2008/0010204 A1* | 1/2008 | Rackley, III | ........ | G06Q 20/042 705/45 |
| 2008/0010215 A1* | 1/2008 | Rackley, III | ........ | G06Q 20/042 705/70 |
| 2008/0040265 A1* | 2/2008 | Rackley, III | ........... | G06Q 20/02 705/40 |
| 2008/0126145 A1* | 5/2008 | Rackley, III | ........ | G06Q 20/102 455/406 |
| 2008/0162348 A1* | 7/2008 | Lee | ..................... | G06Q 20/10 705/44 |
| 2008/0208681 A1* | 8/2008 | Hammad | ............. | G06Q 20/045 705/13 |
| 2008/0313044 A1* | 12/2008 | Aaltonen | ......... | G06Q 20/35785 705/14.26 |
| 2009/0095805 A1* | 4/2009 | Matsumoto | ............. | G07F 19/00 235/379 |
| 2009/0125429 A1* | 5/2009 | Takayama | .............. | G06Q 20/04 705/35 |
| 2009/0319425 A1* | 12/2009 | Tumminaro | ......... | G06Q 20/108 705/42 |
| 2010/0004996 A1* | 1/2010 | Fujita | ................... | G06Q 20/105 705/14.64 |
| 2010/0036742 A1* | 2/2010 | Ito | ........................ | G06Q 20/202 705/21 |
| 2010/0217710 A1* | 8/2010 | Fujita | .................... | G06Q 20/06 705/71 |
| 2010/0241536 A1* | 9/2010 | Tanaka | ................... | G06Q 20/10 705/30 |
| 2011/0057025 A1* | 3/2011 | Denzer | .................. | G06Q 20/20 235/375 |
| 2011/0095086 A1* | 4/2011 | Malhotra | ................ | G06Q 20/06 235/380 |
| 2011/0270743 A1* | 11/2011 | Laight | .................... | G06Q 40/02 705/39 |
| 2011/0295750 A1* | 12/2011 | Rammal | ................ | G06Q 20/12 705/44 |
| 2011/0320345 A1* | 12/2011 | Taveau | ................... | G06Q 20/32 705/39 |
| 2011/0320347 A1* | 12/2011 | Tumminaro | ....... | G06Q 20/0855 705/39 |
| 2012/0018506 A1* | 1/2012 | Hammad | ................ | G06F 21/34 235/375 |
| 2012/0018511 A1* | 1/2012 | Hammad | ................ | G06Q 20/12 235/380 |
| 2012/0031969 A1* | 2/2012 | Hammad | ................ | G06F 21/34 235/380 |
| 2012/0040748 A1* | 2/2012 | Kanisawa | ............... | G06Q 20/06 463/25 |
| 2012/0078735 A1* | 3/2012 | Bauer | ..................... | G06Q 20/20 705/16 |
| 2012/0123841 A1* | 5/2012 | Taveau | ................... | G06Q 20/10 705/14.23 |
| 2012/0123924 A1* | 5/2012 | Rose | ....................... | G06Q 20/12 705/35 |
| 2012/0136780 A1* | 5/2012 | El-Awady | ............... | G06Q 20/14 705/40 |
| 2012/0150669 A1* | 6/2012 | Langley | ............. | G06Q 30/0601 705/16 |
| 2012/0173402 A1* | 7/2012 | Nicolaidis | .............. | G06Q 20/28 705/37 |
| 2012/0203697 A1* | 8/2012 | Morgan | ............. | G06Q 20/3276 705/44 |
| 2012/0215691 A1* | 8/2012 | Tal | .......................... | G06Q 20/02 705/44 |
| 2012/0221420 A1* | 8/2012 | Ross | ..................... | G06Q 40/00 705/16 |
| 2012/0239566 A1* | 9/2012 | Everett | .................. | G06Q 20/10 705/41 |
| 2012/0239567 A1* | 9/2012 | Choi | ..................... | G07F 7/0886 705/41 |
| 2013/0024360 A1* | 1/2013 | Ballout | .................. | G06Q 20/04 705/39 |
| 2013/0159180 A1* | 6/2013 | Jhunjhunwala | ...... | G06Q 20/227 705/41 |

FOREIGN PATENT DOCUMENTS

| | | |
|---|---|---|
| JP | 2004-302787 A | 10/2004 |
| JP | 2004-326727 A | 11/2004 |
| JP | 2008-27166 A | 2/2008 |
| JP | 2008-191709 A | 8/2008 |
| JP | 2009-288921 A | 12/2009 |
| JP | 2010049389 A * | 3/2010 |
| JP | 2011186660 A * | 9/2011 |
| JP | WO 2013099958 A1 * | 7/2013 ......... G06Q 20/3226 |

(56) References Cited

FOREIGN PATENT DOCUMENTS

OTHER PUBLICATIONS

International Search Report of PCT/JP2012/083885, dated Feb. 5, 2013.

* cited by examiner

Fig.4

PAYMENT DEBT DB

| (USER) IDENTIFICATION INFORMATION | TRANSAC-TION ID | PAYMENT AMOUNT | DATE OF PAYMENT | PAYMENT RECIPIENT | PAYMENT APPROVAL | PAYMENT |
|---|---|---|---|---|---|---|
| 425····· | 168····· | 4000YEN | '12 1/25 | Y NEWS-PAPER | ○ | COMPLETED |
| 159····· | 176····· | 2050YEN | '12 1/27 | T ELECTRIC POWER | ○ | NOT YET COMPLETED |

ELECTRONIC MONEY SERVER, ELECTRONIC MONEY PROCESSING METHOD, ELECTRONIC MONEY PROCESSING PROGRAM PRODUCT, AND STORAGE MEDIUM ON WHICH ELECTRONIC MONEY PROCESSING PROGRAM PRODUCT IS STORED

CROSS REFERENCE TO RELATED APPLICATIONS

This application is a National Stage of International Application No. PCT/JP2012/083885 filed Dec. 27, 2012, claiming priority based on Japanese Patent Application No. 2011-290181, filed Dec. 28, 2011, the contents of all of which are incorporated herein by reference in their entirety.

TECHNICAL FIELD

The present invention relates to electronic money servers, electronic money processing methods, electronic money processing program products, and storage media on which the electronic money processing program product is stored.

BACKGROUND ART

In recent years, the use of electronic money has become widespread. In a prepaid electronic money system, electronic information called value, the electronic information provided with the same exchangeable value as money, is stored in an IC (Integrated Circuit) chip carried by the user, and, by reducing it with a terminal in a store or the like, payment of a product or service is made (this type of electronic money is called stored value type electronic money).

On the other hand, processing for increasing the amount of value (hereinafter referred to as the value balance) stored in the IC chip is called recharging, and, by collecting an amount corresponding to the value from the user at the time of recharging, the value is brought into correspondence with actual money, whereby the exchangeable value of the value is ensured.

Incidentally, at present, the widespread electronic money is blank electronic money with the user's name and address unidentified on the electronic money provider's side.

Moreover, the electronic money is used not only for payment of a price in a store and payment of a train fare but also for payment via a network by using a portable terminal or the like. In Patent Document 1, such an example is disclosed.

As described above, with the spread of use of electronic money, there has been a rising demand from the user who desires to make various payments by electronic money if at all possible. For example, if it is possible to make payments of public utility bills (such as electricity, gas, water, and TV reception fees), newspaper subscription, taxes, an insurance premium, and so forth which have to be paid regularly via electronic money, the usefulness of electronic money is further improved.

CITATION LIST

Patent Literature

Patent Document 1: Japanese Patent No. 4334281

DISCLOSURE OF INVENTION

Problem to be Solved by the Invention

An object of the present invention is to provide an electronic money server, an electronic money processing method, an electronic money processing program product, and a storage medium on which the electronic money processing program product is stored, the electronic money server, the electronic money processing method, the electronic money processing program product, and the storage medium that can handle regular bill payment by using electronic money.

SUMMARY OF THE INVENTION

One aspect of an embodiment of the invention provides an electronic money server that can connect to a portable terminal having a function of storing value of electronic money expressing an amount of money value as electronic data, the portable terminal having unique identification information, the electronic money server comprising: a payment debt creating means for creating, in response to a request from the portable terminal or independently, a payment debt that has to be paid on a predetermined date in a state in which the payment debt is related to the unique identification information of the portable terminal; a payment debt recording storage that records the payment debt; an amount change information sending means for sending, to the portable terminal, amount change information by which the value stored in the portable terminal is increased or decreased; and a payment debt clearing means for clearing the payment debt recorded in the payment debt recording storage when the amount change information sending means sends amount change information by which the value is decreased by a payment debt amount and the value stored in the portable terminal is decreased by the amount change information.

Another aspect of an embodiment provides the electronic money server, further comprising: a payment approval requesting means for requesting the portable terminal to approve payment on a predetermined date of a payment debt if the payment debt is a payment debt uniquely created by the payment debt creating means, wherein in response to a payment approval request issued by the payment approval requesting means, after notification of approval is received from the portable terminal, the amount change information sending means sends amount change information by which the value is decreased by a payment debt amount.

A further aspect of a preferred embodiment provides the electronic money server, wherein in response to a payment approval request issued by the payment approval requesting means, under a condition that notification of disapproval is not received from the portable terminal, approval is deemed to be given if no response is sent back.

A further aspect of a preferred embodiment provides the electronic money server, further comprising: a payment debt presence or absence check accepting means for accepting an inquiry about a presence or absence of a payment debt from the portable terminal by searching the payment debt recording storage, wherein when an inquiry about the presence or absence of a payment debt is accepted by the payment debt presence or absence check accepting means, if a payment debt is present, the payment approval requesting means requests approval of payment.

A further aspect of a preferred embodiment provides the electronic money server, further comprising: a payment debt creation request accepting means for receiving, from the portable terminal, a payment debt creation request, an amount of a payment debt, and unique identification information, wherein after the payment debt creation request accepting means receives a payment debt creation request, the payment debt creating means creates a payment debt.

A further aspect of a preferred embodiment provides the electronic money server, wherein the payment approval requesting means requests collective approval of payment for a plurality of payment debts that meet a certain requirement.

A further aspect of a preferred embodiment provides the electronic money server, wherein when a value balance becomes insufficient if the amount change information sending means sends amount change information by which an amount corresponding to a payment debt is decreased, the amount change information sending means sends in advance amount change information by which an amount is increased by an amount corresponding to a shortfall and a predetermined amount.

Another aspect of a preferred embodiment provides an electronic money processing method in an electronic money server that can connect to a portable terminal having a function of storing value of electronic money expressing an amount of money value as electronic data, the portable terminal having unique identification information, the method comprising: a payment debt creating step of creating, in response to a request from the portable terminal or independently, a payment debt that has to be paid on a predetermined date in a state in which the payment debt is related to the unique identification information of the portable terminal; a payment debt recording function of recording of the payment debt; an amount change information sending step of sending, to the portable terminal, amount change information by which the value stored in the portable terminal is increased or decreased; and a payment debt clearing step of clearing the payment debt when amount change information by which the value is decreased by a payment debt amount is sent in the amount change information sending step and the value stored in the portable terminal is decreased by the amount change information.

A further aspect of a preferred embodiment provides an electronic money processing program product in an electronic money server that can connect to a portable terminal having a function of storing value of electronic money expressing an amount of money value as electronic data, the portable terminal having unique identification information, the program product that makes a computer implement: a payment debt creating function of creating, in response to a request from the portable terminal or independently, a payment debt that has to be paid on a predetermined date in a state in which the payment debt is related to the unique identification information of the portable terminal; a payment debt recording function of recording of the payment debt; an amount change information sending function of sending, to the portable terminal, amount change information by which the value stored in the portable terminal is increased or decreased; and a payment debt clearing function of clearing the payment debt when amount change information by which the value is decreased by a payment debt amount is sent by the amount change information sending function and the value stored in the portable terminal is decreased by the amount change information.

A further aspect of a preferred embodiment provides a storage medium on which an electronic money processing program product is stored, the electronic money processing program product in an electronic money server that can connect to a portable terminal having a function of storing value of electronic money expressing an amount of money value as electronic data, the portable terminal having unique identification information, the program product that makes a computer implement: a payment debt creating function of creating, in response to a request from the portable terminal or independently, a payment debt that has to be paid on a predetermined date in a state in which the payment debt is related to the unique identification information of the portable terminal; a payment debt recording function of recording of the payment debt; an amount change information sending function of sending, to the portable terminal, amount change information by which the value stored in the portable terminal is increased or decreased; and a payment debt clearing function of clearing the payment debt when amount change information by which the value is decreased by a payment debt amount is sent by the amount change information sending function and the value stored in the portable terminal is decreased by the amount change information.

EFFECT OF THE INVENTION

According to the present invention, it is possible to make regular bill payment by electronic money.

BRIEF DESCRIPTION OF DRAWINGS

FIG. 4 is a diagram depicting the configuration of a payment debt DB;

BEST MODES FOR CARRYING OUT THE INVENTION (A) Outline of an Embodiment

Figure 1:
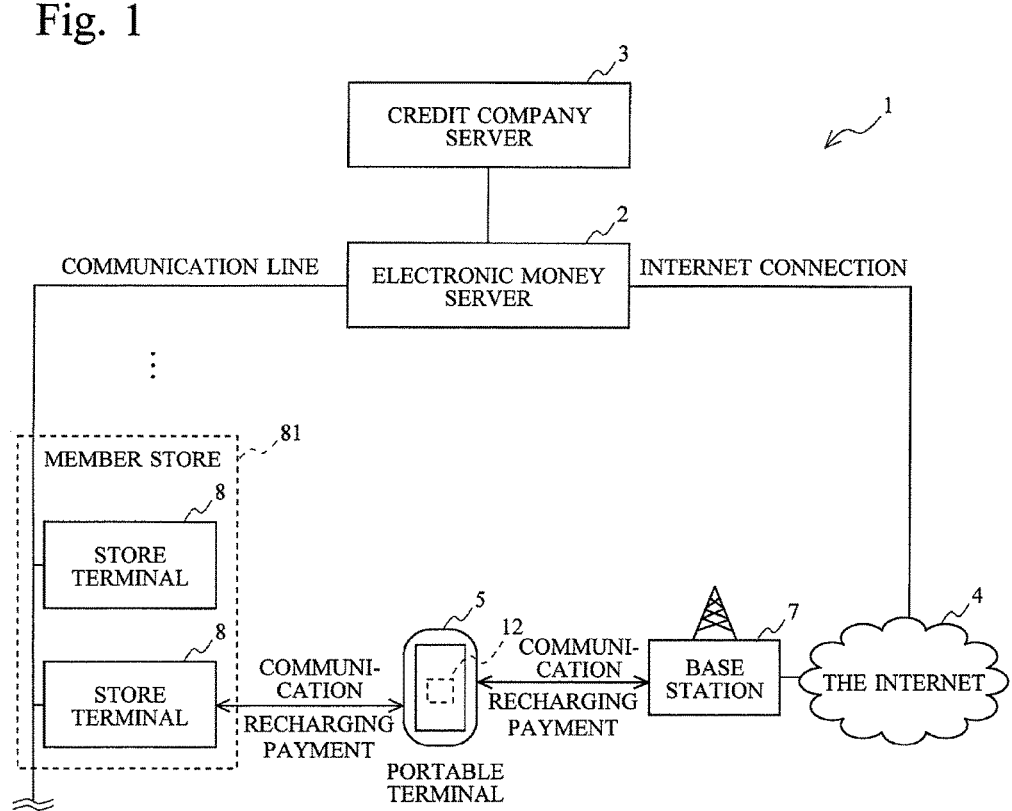
FIG. 1 is a diagram depicting the network configuration of an electronic money system.

FIG. 1 is a diagram for explaining the basic configuration of an electronic money system according to an embodiment.

This electronic money system 1 is formed of an electronic money server 2, a credit company server 3, the Internet 4, a portable terminal 5, a base station 7, a store terminal 8 installed in a member store 81, and so forth.

Figure 2:
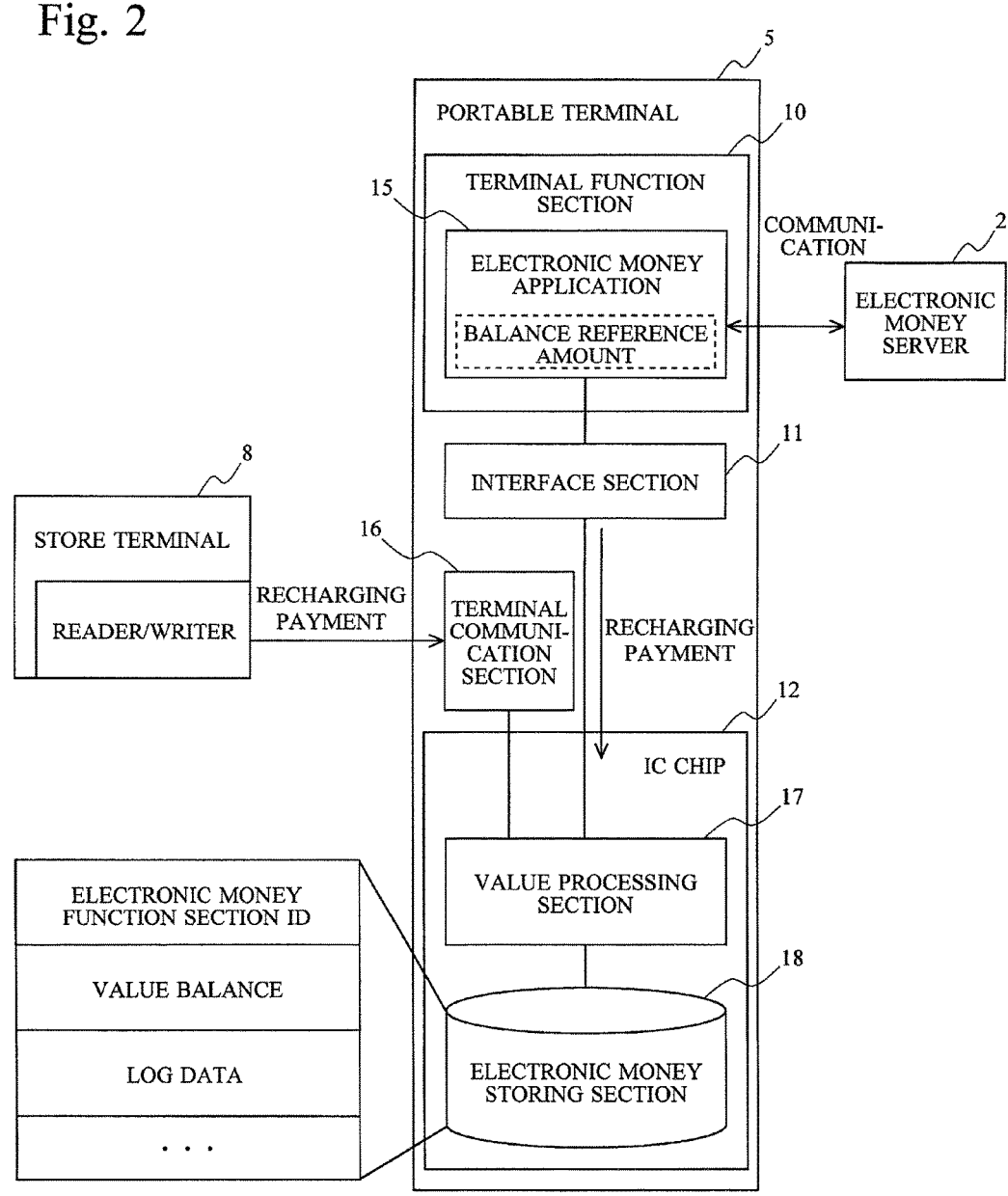
FIG. 2 is a diagram for explaining the configuration of a portable terminal.

Moreover, the portable terminal 5 includes, as depicted in FIG. 2, an IC chip 21 on which value is stored and an electronic money application 15. The electronic money application 15 performs various processing related to electronic money. Furthermore, the electronic money application 15 stores a balance reference amount and an automatic recharging amount that are set by the user in advance, the balance reference amount and the automatic recharging amount related to automatic recharging which will be described later.

Hereinafter, processing of this embodiment will be performed in the order of numbers in parentheses.

(1) In the electronic money server 2, in response to a request from the portable terminal 5, or, on the part of the electronic money server 2, a payment debt is created in a state in which the payment debt is related to an electronic money function section ID. Specifically, the payment debt is payment of various public utility bills, newspaper subscription, taxes, and so forth.

(2) The electronic money application 15 of the portable terminal 5 issues a request to check a payment debt to the electronic money server 2.

(3) In the electronic money server 2, the presence or absence of a payment debt is checked, and, if there is no payment debt, the electronic money server 2 provides notification to the effect that there is no payment debt; if there is a payment debt, the electronic money server 2 sends a payment connection request.

(4) In response to this, when receiving the entry of "payment approval" from the user, the electronic money application 15 of the portable terminal 5 sends "payment connection request approval" to the electronic money server 2.

(5) The electronic money server 2 that has received the "payment connection request approval" sends a "payment request" to the portable terminal 5 and reduces the value stored in the IC chip 12. At the same time, the electronic money server 2 performs procedures to send money to a transfer destination server.

(6) Then, the electronic money server 2 clears the created payment debt and notifies the portable terminal 5 of the completion of payment.

(B) Details of the Embodiment

First Embodiment

FIG. 1 is a diagram depicting the network configuration of the electronic money system 1 according to this embodiment.

This electronic money system 1 is formed of the electronic money server 2, the credit company server 3, the Internet 4, the portable terminal 5, the base station 7, the store terminal 8 installed in the member store 81, and so forth, which cooperate with one another to maintain and manage the electronic money system 1.

The portable terminal 5 is a portable terminal having an Internet communication function, such as a smartphone and a mobile telephone, and incorporates the IC chip 12.

The portable terminal 5 can perform communication with the electronic money server 2 via the Internet 4 by performing radio communication with the base station 7.

The IC chip 12 includes an antenna for short-distance radio communication and can perform short-distance radio communication with the store terminal 8.

The IC chip 12 can store value and can perform recharging and payment by executing a command that is sent from the store terminal 8.

Moreover, the IC chip 12 can also perform recharging and payment by communicating with the electronic money server 2 via the portable terminal 5 and executing a command that is sent from the electronic money server 2.

In the portable terminal 5, the electronic money application 15 is installed. In the portable terminal 5, the electronic money application 15 performs various processing related to electronic money.

Moreover, the electronic money application 15 has the function of performing automatic recharging on the IC chip 12. This function checks the value balance of the IC chip 12 at regular intervals and accesses the electronic money server 2 and requests for the electronic money server 2 to perform recharging if the value balance is less than or equal to or less than the balance reference amount.

In response to this request, the electronic money server 2 sends a command to the IC chip 12 and recharges the IC chip 12. As just described, automatic recharging that is performed by the electronic money application 15 will be referred to as automatic recharging.

The electronic money server 2 is a server that manages the distribution of value in the electronic money system 1. The electronic money server 2 collects log data on recharging and payment history from the store terminal 8 at regular or irregular intervals. Then, the electronic money server 2 compiles this log data and log data collected when recharging and payment were performed directly on the IC chip 12 and brings the distribution of value into correspondence with currency.

The member store 81 is a business operator, such as a retail store, a business office, or a commercial car, which offers products or services in return for the price paid by the user.

The member store 81 joins a federation using the electronic money service offered by the electronic money system 1 and includes a single store terminal 8 or a plurality of store terminals 8.

The store terminal 8 performs short-distance radio communication with the IC chip 12 and performs recharging and payment by sending a command to the IC chip 12.

The store terminal 8 sends log data on the details of the processing performed between the store terminal 8 and the IC chip 12 to the electronic money server 2 by batch processing at regular or irregular intervals.

The credit company server 3 is a configuration that is used when automatic recharging is performed and is a server used by a credit company to manage payment made by credit cards.

The user of the IC chip 12 has made a contract with the credit company and registered his/her own credit card number on the electronic money server 2.

When the electronic money server 2 recharges the IC chip 12, the credit company server 3 makes payment of the recharging by using the credit card number of the user.

FIG. 2 is a diagram for explaining the configuration of the portable terminal 5.

The portable terminal 5 includes a terminal function section 10, the IC chip 12, an interface section 11 that connects them, and a terminal communication section 16 that is formed of an IC chip provided with an antenna for short-distance radio communication. Incidentally, there is also an IC chip 12 incorporating the terminal communication section 16.

The IC chip 12 includes a CPU (Central Processing Unit), ROM (Read Only Memory), RAM (Random Access Memory), an EEPROM (Electrically Erasable Programmable ROM), and so forth, and serves as a computer.

As will be described later, the terminal function section 10 also serves as a computer, and the portable terminal 5 is in a state in which two computers are connected to each other via the interface section 11.

It is possible to install, on the EEPROM, in addition to an OS (Operating System), for example, a plurality of pieces of application software such as an application serving as a discount card and an application serving as a membership card and execute these application software.

In this embodiment, an application program product for electronic money processing is installed, and, by executing this program product by the CPU, a value processing section 17, an electronic money storing section 18, and so forth are formed.

The electronic money storing section 18 stores an electronic money function section ID, a value balance, log data, and so forth.

The electronic money function section ID is identification information for identifying the application for electronic money processing installed on the IC chip 12.

The value balance is the amount of value that is currently stored.

The log data is log data on the details of processing when processing related to electronic money such as recharging, payment, and balance reference is performed.

The value processing section 17 executes a command input from the store terminal 8 via the terminal communication section 16. As a result, the value processing section 17 performs recharging, payment, balance reference, reference to the electronic money function section ID, reference to the log data, and so forth.

Incidentally, the terminal communication section 16 includes an antenna for short-distance radio communication and mediates communication between the store terminal 8 and the value processing section 17. The store terminal 8 includes a reader/writer provided with an antenna for short-distance radio communication, and the terminal communication section 16 performs communication with the store terminal 8 via the reader/writer.

As a recharging command for performing recharging, an addition command or an overwriting command can be used.

The addition command is a command to make the value processing section 17 perform processing to add an amount specified by a parameter.

For example, when recharging of an amount corresponding to 1000 yen is performed, the value processing section 17 adds 1000 yen to the value balance of the electronic money storing section 18 in accordance with the addition command input from the store terminal 8 and writes the value after addition over the value balance of the electronic money storing section 18.

The overwriting command is a command to make the value processing section 17 perform overwriting processing by an amount specified by a parameter.

For example, when recharging of an amount corresponding to 1000 yen is performed, first, the store terminal 8 reads the value balance from the IC chip 12 by a balance reference command. Next, the store terminal 8 adds 1000 yen to the value balance and inputs, to the IC chip 12, an overwriting command by which overwriting by the value after addition is performed. The IC chip 12 executes this command and performs overwriting of the value balance of the electronic money storing section 18.

Moreover, as a payment command for making payment, a subtraction command or an overwriting command can be used.

The subtraction command is a command to make the value processing section 17 perform processing to subtract an amount specified by a parameter.

For example, when payment corresponding to 1000 yen is made, the value processing section 17 subtracts 1000 yen from the value balance of the electronic money storing section 18 in accordance with the subtraction command input from the store terminal 8 and writes the value after subtraction over the value balance of the electronic money storing section 18.

When payment is made by using the overwriting command, payment can be made in a manner similar to a case where recharging is performed by the overwriting command.

Which to choose out of the addition command and the overwriting command as the recharging command and which to choose out of the subtraction command and the overwriting command as the payment command depend on the system design of the electronic money system 1.

The terminal function section 10 is a computer provided with a CPU, ROM, RAM, an EEPROM, a multi-touch screen, a speaker, a microphone, an RF circuit, and so forth and is connected to the IC chip 12 via the interface section 11.

The terminal function section 10 can perform communication with the base station 7 by an unillustrated RF circuit and can perform communication with the IC chip 12 via the interface section 11.

It is possible to install, on the EEPROM, in addition to an OS, a plurality of pieces of application software such as a browser and a game and execute these application software.

The multi-touch screen is placed on a display screen of the portable terminal 5 and allows the user to operate the application software by, for example, selecting an item by touching the screen with his/her fingertip.

In this embodiment, the electronic money application 15 which is application software offering various services related to electronic money is installed on the EEPROM and is operated.

The electronic money application 15 is formed by, for example, downloading a program product for the electronic money application 15 from the electronic money server 2 to the terminal function section 10 and installing the program product or distributing a recording medium on which the program product is recorded to the users and installing the program product on the terminal function section 10 from the recording medium.

The electronic money application 15 can perform communication with the electronic money server 2 by using the communication function of the portable terminal 5.

Then, the electronic money application 15 performs, on the electronic money server 2, user registration, an inquiry about the presence or absence of a payment debt, approval of payment connection, and setting of automatic recharging and cooperates with the electronic money server 2 to perform automatic recharging.

Moreover, the electronic money application 15 can also perform communication with the IC chip 12 via the interface section 11.

As a result, the electronic money application 15 can read the value balance from the IC chip 12 by inputting a balance reference command to the IC chip 12, read the electronic money function section ID by inputting an ID reference command, and read the log data by inputting a log data reference command.

Figure 3:
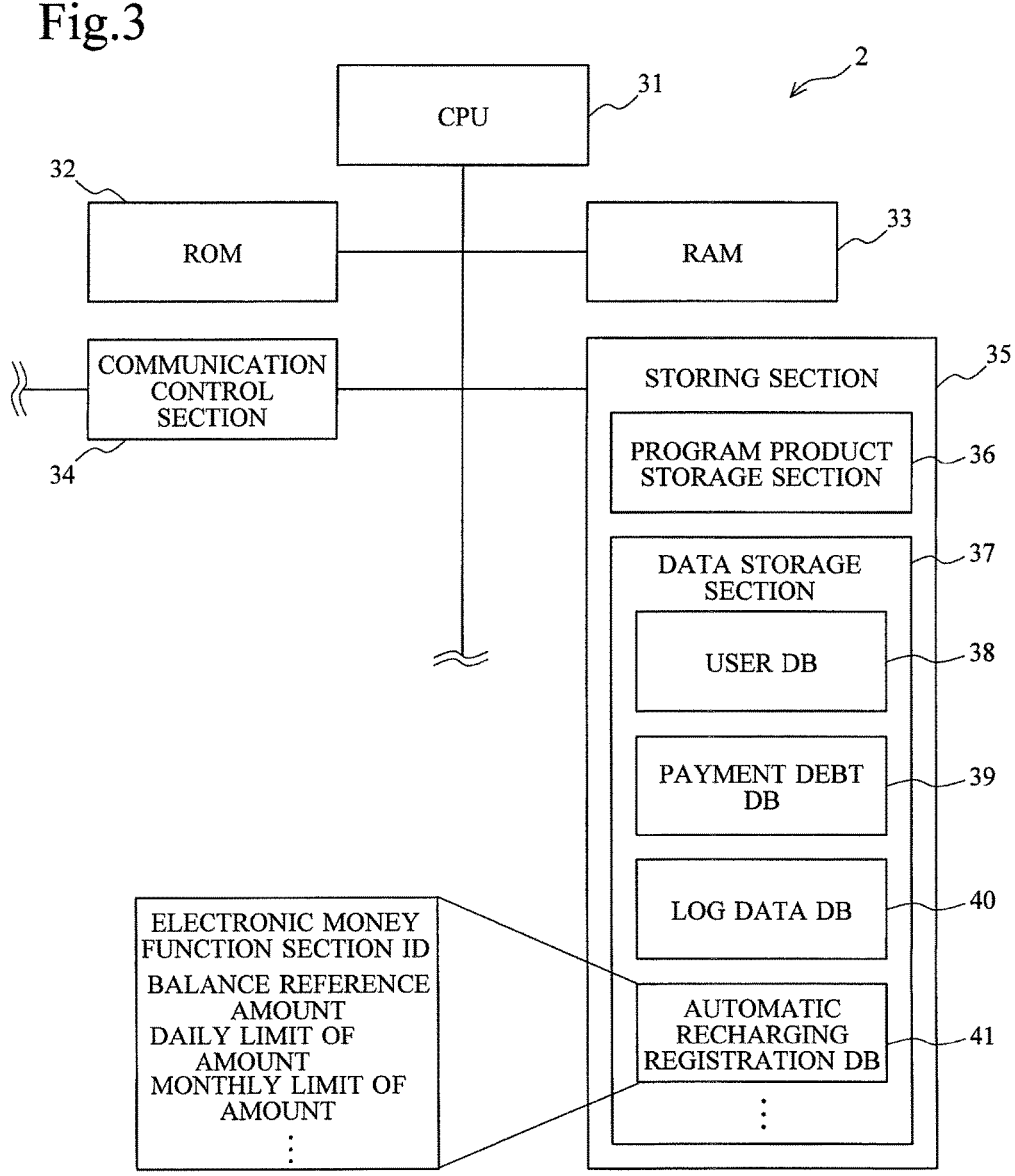
FIG. 3 is a diagram depicting an example of the hardware configuration of an electronic money server.

FIG. 3 is a diagram depicting an example of the hardware configuration of the electronic money server 2.

The electronic money server 2 is formed of a CPU 31, ROM 32, RAM 33, a communication control section 34, a storing section 35, and so forth which are connected to one another via a bus line, and forms an information processing server.

The CPU 31 is a central processing unit that performs various information processing in accordance with a predetermined program product.

In this embodiment, the CPU 31 accepts, from the portable terminal 5, an inquiry about the presence or absence of a payment debt and performs automatic recharging in response to a request for automatic recharging. Moreover, the CPU 31 collects the log data from the store terminal 8 and compiles the log data.

Incidentally, there is no need for the CPU 31 to perform all of these functions, and a plurality of server apparatuses may be combined to configure a system having the same functions as those of the electronic money server 2.

The ROM 32 is read-only memory, and a basic program product for making the electronic money server 2 operate, a parameter, and so forth are stored therein.

The RAM 33 is readable/writable memory and, for example, offers working memory for the CPU 31 and loads the program product and data stored in the storing section 35 and stores them.

The communication control section 34 performs communication with the store terminal 8 and performs communication with the portable terminal 5 via the Internet 4 or the base station 7.

The storing section 35 is configured by using a large-capacity storage device such as a hard disk and is formed of a program product storage section 36 storing various program products, a data storage section 37 storing data, and so forth.

In the program product storage section 36, an OS, a program product for performing automatic recharging, a program product for processing the log data, and other program products are stored.

In the data storage section 37, a user DB (database) 38 in which a user who uses the electronic money system 1 by the IC chip 12 of the portable terminal 5 or an electronic money card is registered, a payment debt DB 39 on which the created payment debt is recorded, a log data DB 40, an automatic recharging registration DB 41 in which the conditions of automatic recharging and the like are registered, and, though not depicted in the drawing, a member store DB in which the member store 81 is registered, a transaction history DB on which the history of transaction conducted by value is recorded, and other databases are stored.

In the user DB 38, a user ID, a password, the name, the address, the date of birth, the telephone number, and the e-mail address of the user, the electronic money function section ID of the IC chip 12, a credit card number, the presence or absence of registration of the use of automatic recharging, and so forth are stored in a state in which they are related to each user ID. As described above, in the electronic money system 1, automatic recharging service is offered to the user who has registered his/her intention to use automatic recharging in the user DB 38.

Incidentally, in the user DB 38, when the charge for automatic recharging is deducted from a savings account (for example, a bank account) of the user, a savings account number (for example, a bank account number) of the user is stored; when the automatic recharging amount is added to the telephone charge, a user ID of a mobile telephone company is stored. Moreover, when a plurality of payment means (such as a credit card and a savings account) are used, the procedure of payment can also be stored.

FIG. 4 is a diagram for explaining the logical configuration of the payment debt DB 39.

In the payment debt DB 39, "(user) identification information", "transaction ID", "payment amount", "date of payment", "payment recipient", "presence or absence of payment approval", and "payment (presence or absence of completion of payment" are stored.

The "(user) identification information" is information for identifying a user, and, for example, the electronic money function section ID can be used.

The "transaction ID" is information for identifying a transaction that created a payment debt.

Specifically, the "transaction ID" is information for identifying "January's subscription fee of user A for Y Newspaper". The "transaction ID" is determined in advance at the time of contract on which creation of a payment debt is predicated. Then, at the time of creation of a payment debt, for a transaction related to the transaction ID, notification that a payment debt has been created may be provided to a destination to which the fee is to be transferred.

Moreover, when a transfer to a transfer destination server 100 is performed, notification with a string attached thereto is provided. By doing so, a destination of a transfer (a creditor) can check for what the payment has been made.

Next, with reference to a flowchart of FIG. 5, processing of payment of routine bills according to this embodiment will be described.

On the part of the electronic money server 2, a payment debt is created in a state in which the payment debt is related to an electronic money function section ID (step 105). This creation of a payment debt is predicated on the presence of the contract or agreement between a creditor and a debtor. Specifically, the contract or agreement between a creditor and a debtor is as follows: "Monthly subscription fee 4000 yen of user A for Y Newspaper shall be paid on the 25th of each month by electronic money. User A shall perform payment processing with a portable terminal 5 provided with an electronic money function section ID.". At this time, the "transaction ID" is also set.

This creation of a payment debt is spontaneously performed on the part of the electronic money server 2. However, for example, a payment debt may be created in response to a request for creation of a payment debt from the portable terminal 5 (step 100a). In this case, the user starts the electronic money application 15 of the portable terminal 5, sends the electronic money function section ID and the "transaction ID" in a state in which the electronic money function section ID is related to the "transaction ID", and requests creation of a payment debt.

Moreover, a payment debt may be created in response to a request for creation of a payment debt from the transfer destination server 100 (step 100b). In this case, with a request for creation of a payment debt, the "transaction ID" is also sent to the electronic money server 2.

When a payment debt is created, the electronic money server 2 records the created debt on the payment debt DB 39. At this time, since the transaction ID is also recorded, they are related to each other.

When a payment debt is created, the electronic money server 2 notifies the transfer destination server 100 of the creation of a payment debt and the "transaction ID" (step 110). This processing is not indispensable and can be omitted.

Incidentally, when a payment debt is created or after a lapse of a predetermined time after the creation, the electronic money server 2 may notify the portable terminal 5 of the creation by e-mail, for example.

By providing notification in advance, it is possible to promote recharging of value required for payment in advance and avoid a shortage of value at the time of payment.

On the other hand, the electronic money application 15 of the portable terminal 5 requests the electronic money server 2 to perform a payment debt check to check whether or not there is a payment debt (step 115). Setting may be made so that this check is performed every day, but, for example, setting can be appropriately made so that this check is performed every other day, twice a week, every week, or the like depending on the situation.

Specifically, the portable terminal 5 starts the electronic money application 15 and performs polling to check whether or not there is a payment debt.

In response to this, the electronic money server 2 checks whether or not there is a payment debt (step 120). This check is performed by searching the payment debt DB 39.

As a result, if there is no payment debt (whose payment date has been arrived) (step 120; N), the electronic money server 2 notifies the portable terminal 5 of the absence of a payment debt (step 125).

Figure 6:
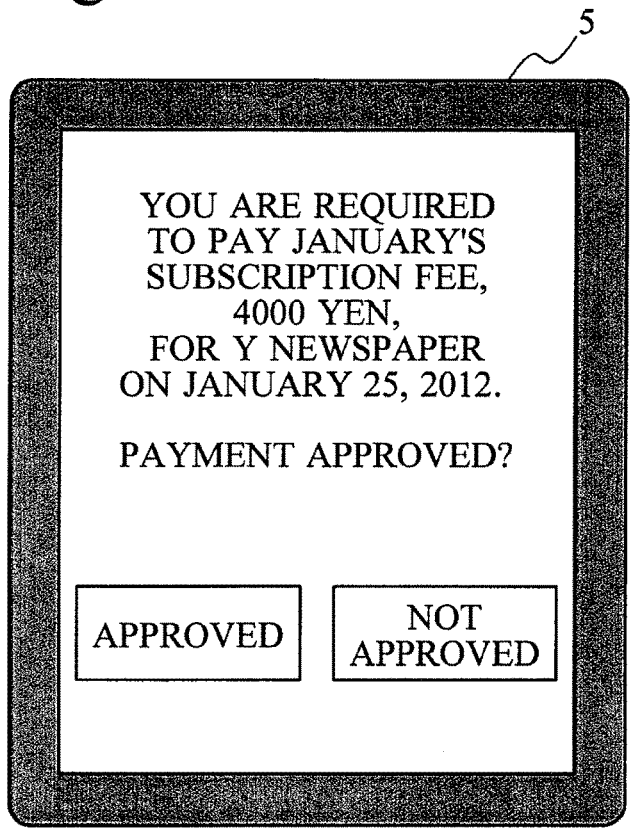
FIG. 6 is a diagram depicting an example of a payment debt approval screen.

On the other hand, if there is a payment debt and the payment date has been arrived (step 120; Y), the electronic money server 2 sends a payment connection request to the portable terminal 5 (step 130). In response to this payment connection request, the electronic money application 15 performs a display depicted in FIG. 6 on the screen of the portable terminal 5 and requests approval from the user.

When the user's intention of approval is received from the user as a result of the user touching an "approval" button, the electronic money application 15 sends notification of approval of the payment connection request to the electronic money server 2 (step 135).

The electronic money server 2 makes a payment request by sending a subtraction command to the IC chip 12 of the portable terminal 5 (step 140). In response to this, when subtraction processing (payment) is performed in the IC chip 12, the electronic money application 15 of the portable terminal 5 notifies the electronic money server 2 of the completion of subtraction (step 145).

In response to this, the electronic money server 2 clears the payment debt. Specifically, the electronic money server 2 enters "completed" in the "payment" of the payment debt DB 39. At the same time, the electronic money server 2 sends the corresponding amount to the transfer destination server (step 150). At this time, the electronic money server 2 also sends the transaction ID. By doing so, the transfer destination server 100 can determine to which transaction this payment is related.

Here, the electronic money server 2 outputs data to be paid to a collector of public utility bills. Then, transfer to the collector of public utility bills may be electrically performed, or the operator of the electronic money server 2 may output a payment slip for performing transfer and perform transfer separately.

Then, the electronic money server 2 sends payment completion notification to the portable terminal 5 (step 155) and ends the processing.

The processing of this embodiment is repeated monthly once a month in the case of, for example, newspaper subscription, an electricity rate, and a gas rate.

Moreover, in the case of payment performed once every two months, such as a water rate, the above processing is repeated once every two months.

Furthermore, as for what is payable by quarterly installment payment, such as a fixed property tax, the above processing is performed quarterly. Incidentally, as for what is payable by payment in a lump sum or installment payment, such as a fixed property tax, the user may be made to select which way to pay a fixed property tax at the time of a first payment.

Next, another example of approval of the payment connection request in step 135 of FIG. 5 will be described.

In the example described above, if there is a payment debt (step 120; Y), a payment connection request is issued from the electronic money server 2 to the portable terminal 5 (step 130), and, in response to this, approval of the payment connection request (step 135) is sent from the portable terminal 5.

However, this embodiment is not limited thereto and may be configured such that "approval" is obtained from the portable terminal 5 at another point of time.

For example, if a payment debt creation request is issued from the portable terminal 5 in step 100*a*, processing corresponding to step 130 and step 135 is performed at this point of time and "approval" is obtained in advance.

Moreover, if a payment debt creation request is issued from the transfer destination server 100 in step 100*b*, the processing corresponding to step 130 and step 135 is also performed at this point of time and "approval" is obtained in advance.

This processing for obtaining "approval" may be performed before or after the processing performed in step 105 for creating a payment debt.

Incidentally, in the example described above, since "approval" is already obtained, in the case of step 120 (step 120; Y), it is possible to omit the processing in step 130 and step 135 and proceed directly to the processing in step 140.

Next, processing that is performed when notification of approval of the payment connection request is not sent from the portable terminal 5 in step 135 will be described.

In this case, a configuration can also be adopted in which "approval" will be deemed to be obtained under condition of the absence of positive "disapproval".

By adopting this configuration, it is possible to prevent the inconvenience of suspending payment if the user of the portable terminal 5 forgets to send approval.

On the other hand, from the perspective of the user of the portable terminal 5, the user can be automatically deemed to give approval by doing nothing and leaving a request as it is when receiving the request in step 130.

However, when this configuration is adopted, it is important to make the things to the effect that "the absence of a response shall be regarded as deemed approval" known in advance.

Modified Example 1

In the embodiment described above, approval of payment is obtained for each payment debt, but obtaining approval each time is troublesome and can be considered to hamper the convenience of the user.

Therefore, approval is given collectively to payment debts in a certain period of time. For example, when payments of newspaper subscription, an electricity rate, and a gas rate are made at the end of month, the processing for these payments in step 130 of FIG. 5 is collectively performed. By doing so, it is possible to reduce the inconvenience for the user to perform approval processing many times.

When collective approval is requested, for the sake of convenience of the user, the total required amount may be presented.

On the other hand, on the part of the electronic money server 2, processing of each payment debt is performed in the same manner as the processing of normal debt.

Figure 5:
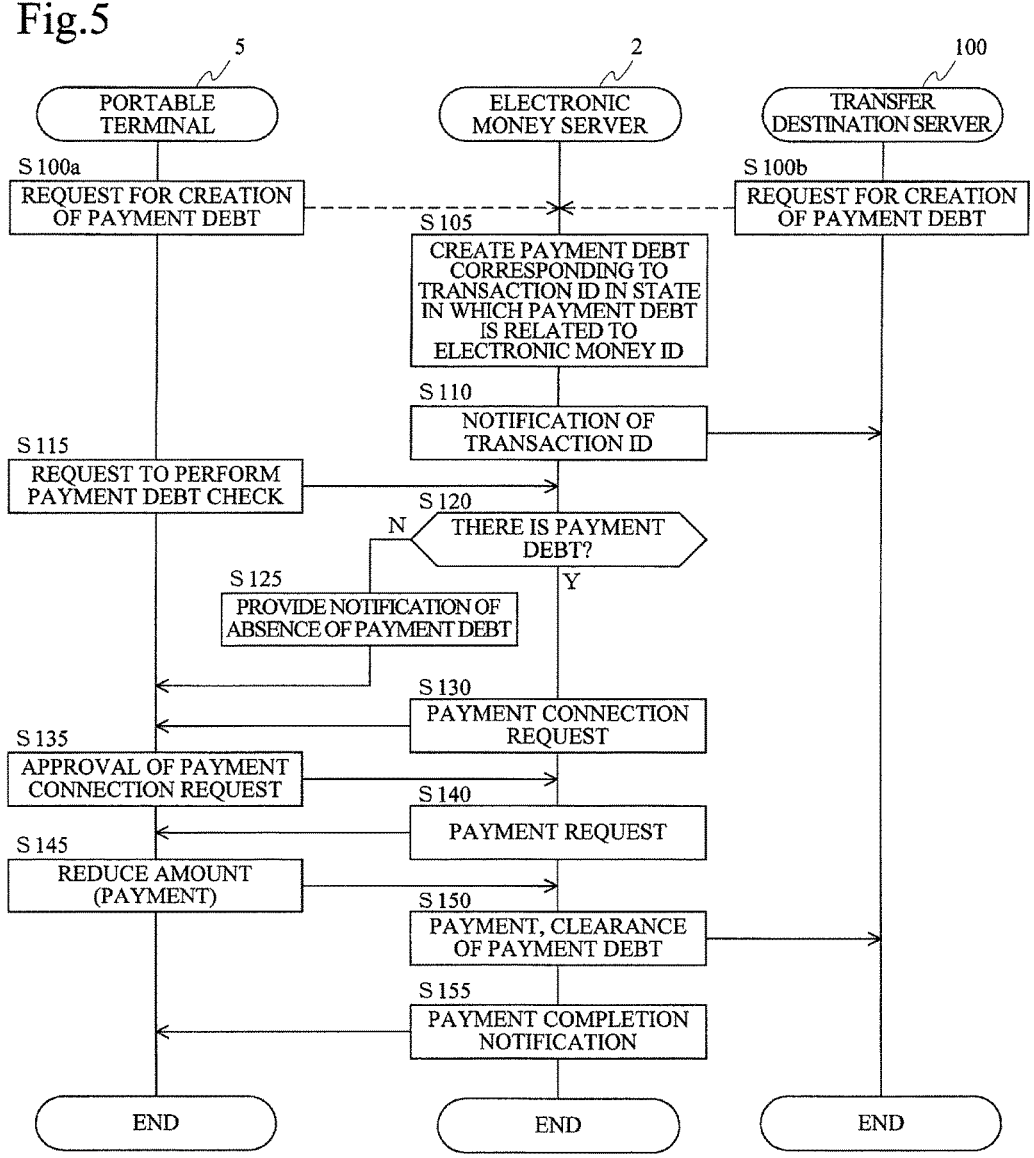
FIG. 5 is a flowchart depicting the procedure of an embodiment.

Incidentally, also in Modified Example 1, as is the case with the above-described example, a point of time at which "approval" is obtained may be set at point of time different from that of the example of FIG. 5, and, a configuration may be adopted in which "the absence of a response shall be regarded as deemed approval" under condition of the absence of notification of "disapproval".

Modified Example 2

Next, processing that is performed when payment cannot be made because of insufficient balance when a payment request is issued to the portable terminal 5 in step 140 of FIG. 5 will be described.

When balance is insufficient, automatic recharging is performed.

First, this automatic recharging will be described.

The electronic money application 15 stores the balance reference amount set by the user. The balance reference amount is the amount used as a reference when automatic recharging is performed.

The electronic money application 15 obtains the value balance by inputting a balance reference command to the IC chip 12 at regular intervals (for example, at hourly intervals) and, when the value balance becomes less than or equal to (or less than) the balance reference amount, the electronic money application 15 starts automatic recharging operation.

In this case, the electronic money application 15 accesses the electronic money server 2 and makes a request for automatic recharging.

Then, the electronic money application 15 inputs, to the IC chip 12, a recharging command sent from the electronic money server 2 in response to this request and causes the IC chip 12 to be recharged.

At this time, the electronic money application 15 encrypts the communication path from the electronic money server 2 to the IC chip 12 to increase security.

Incidentally, an automatic recharging amount is stored in the electronic money server 2 (the automatic recharging registration DB 41) and is used for automatic recharging; instead, a configuration may be adopted in which an automatic recharging amount is stored in the electronic money application 15 and is sent to the electronic money server 2 every time automatic recharging is performed.

In the automatic recharging registration DB 41 (refer to FIG. 3) of the electronic money server 2, an electronic money function section ID, a balance reference amount, an automatic recharging amount, a daily limit of amount, a monthly limit of amount, and so forth are stored in a state in which the electronic money function section ID, the balance reference amount, the automatic recharging amount, the daily limit of amount, the monthly limit of amount, and so forth are related to each user.

The balance reference amount is the same as that stored in the electronic money application 15. Therefore, the electronic money server 2 does not always have to store the balance reference amount, but the balance reference amount is stored also in the electronic money server 2 for management of the IC chip 12.

The automatic recharging amount is the amount added to the IC chip 12 by one automatic recharging operation.

The daily limit of amount is the upper limit of the total recharging amount per day by automatic recharging.

The monthly limit of amount is the upper limit of the total recharging amount per month by automatic recharging.

Moreover, a configuration may be adopted in which ceilings are set on the number of times per day and the number of times per month.

Figure 7:
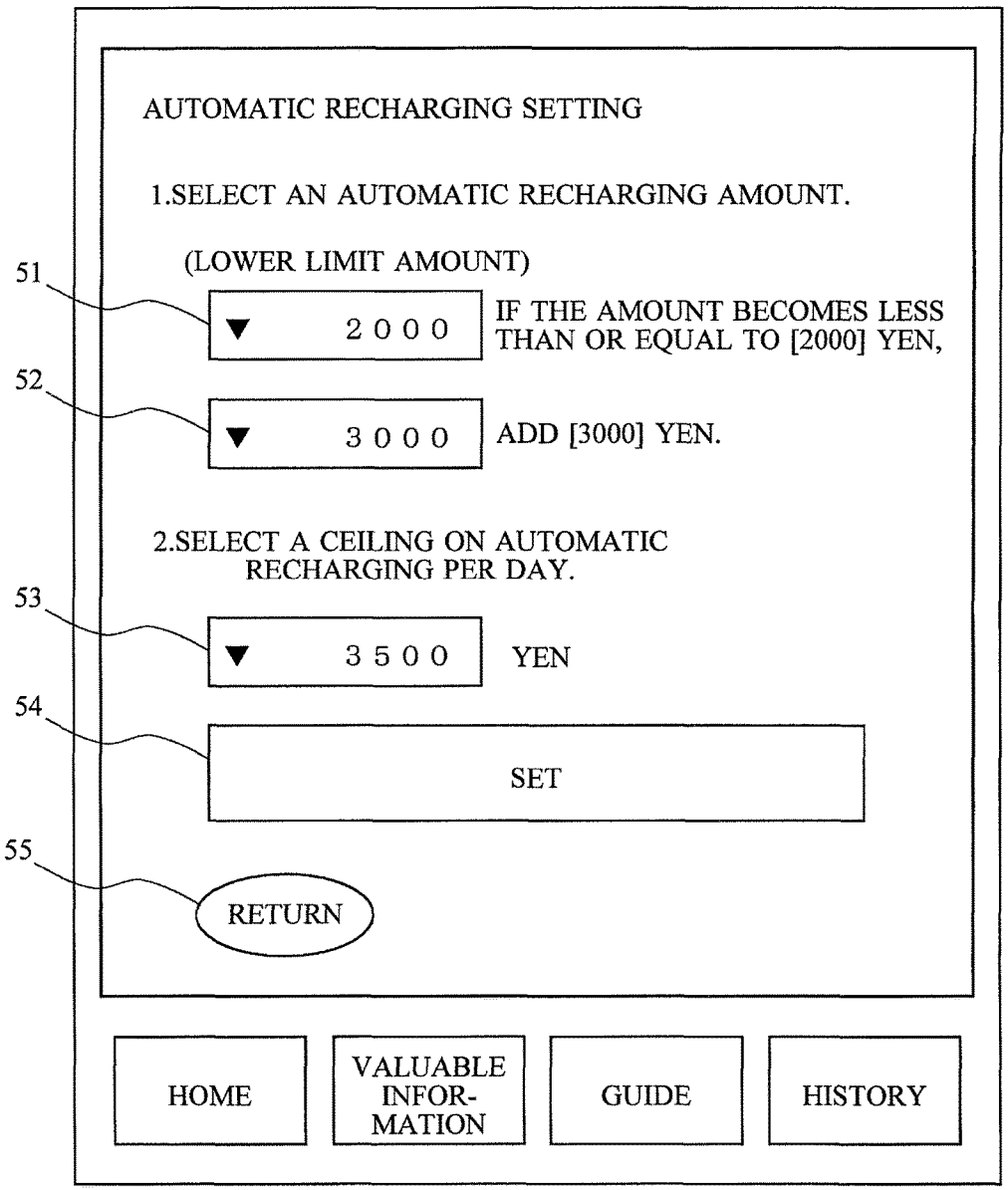
FIG. 7 is a diagram for explaining setting of automatic recharging.

FIG. 7 is a diagram depicting an automatic recharging setting screen that is displayed on the portable terminal 5.

The automatic recharging setting screen is displayed as a result of the electronic money application 15 having accessed the electronic money server 2.

Incidentally, in addition to this, the screens provided to the portable terminal 5 by the electronic money server 2 include various screens such as a user registration screen.

In the automatic recharging setting screen, under the display "1. Select an automatic recharging amount.", a balance reference amount entry field 51 and an automatic recharging amount entry field 52 are displayed.

Both the balance reference amount entry field 51 and the automatic recharging amount entry field 52 are combo boxes and make the user select a balance reference amount and an amount to be added by one automatic recharging operation. Incidentally, a configuration can also be adopted in which the user is allowed to enter an arbitrary amount.

Under these entry fields, there is the display "2. Select a ceiling on automatic recharging per day.", and, under this display, a ceiling entry field 53 is displayed.

The ceiling entry field 53 is formed as a drop-down menu and makes the user select a ceiling per day. Incidentally, a configuration can also be adopted in which the user enters an arbitrary amount.

Incidentally, though not depicted in the drawing, a field for selecting a ceiling per month (or in which an arbitrary amount is entered) with a message saying, for example, "3. Select a ceiling on automatic recharging per month." is further provided.

Furthermore, under the ceiling entry field 53, a SET button 54 and a RETURN button 55 are displayed.

The SET button 54 is a button provided for notifying the electronic money server 2 of the contents selected by the user, and, when the SET button 54 is selected, the electronic money application 15 sends the contents set by the user to the electronic money server 2.

The RETURN button 55 is a button provided for returning to the screen displayed before the display of the automatic recharging setting screen.

The automatic recharging setting processing is performed by the CPU incorporated into the IC chip 12 of the portable terminal 5, the CPU incorporated into the terminal function section 10 of the portable terminal 5, and the CPU 31 of the electronic money server 2 in accordance with the application program product for electronic money processing, the program product of the electronic money application 15, and the program product for the electronic money server, respectively.

Here, based on the setting in FIG. 7, assume that there is a payment debt of 4000 yen as newspaper subscription and there is a balance of 1000 yen. In this case, payment can be made by adding a predetermined value 3000 yen by automatic recharging.

However, the remaining value becomes 0 yen immediately. Therefore, automatic recharging is needed again. In such a case, for example, under condition of "approval" in step 135 of FIG. 5, irrespective of the ceiling on automatic recharging per day (FIG. 7, 53), setting is made such that 6000 yen, which is 3000 yen×2, can be added by one automatic recharging operation.

Moreover, when a payment debt is 3000 yen and there is a balance of 1000 yen, a total of 5000 yen: 2000 yen corresponding to a shortfall and 3000 yen corresponding to an automatic recharging amount per one automatic recharging operation may be added by one automatic recharging operation.

As described above, a comparison between the balance and a payment debt is made, and, if the payment debt is greater than the balance and there is not enough balance, an amount corresponding to a shortfall and a normal automatic recharging amount are added at one time. By doing so, it is possible to reduce the number of recharging operations.

Incidentally, a comparison between the balance and a payment debt is made, and, even when the balance is greater than the payment debt and there is enough balance, if the balance is below a lower limit amount (2000 yen), normal automatic recharging is performed in accordance with the setting.

Modified Example 3

Next, the lock function of the portable terminal 5 will be described.

To prevent the electronic money function and the automatic recharging function being abused after the portable terminal 5 is lost or falls into the third party's hands, the electronic money server 2 has the remote lock function.

With the remote lock function, upon receipt of access from the user, when user authentication is successfully performed, the electronic money function and automatic recharging service are suspended. As the combination of information used for user authentication, for example, (a user's name, an e-mail address, and a password), (a user's name, a date of birth, an e-mail address, and a password), (a telephone number, a date of birth, an e-mail address, and a password), and so forth can be used.

With this lock function, it is possible to lock a particular area, a particular block, and a particular storage area of the IC chip 12 by selection.

As a result, if the user loses the portable terminal 5, it is possible to set a lock so that the normal electronic money function and automatic recharging function cannot be used and, at the same time, keep alive the function of automatic payment of public utility bills according to this embodiment.

Therefore, even when the user sets the suspension of the functions by the remote lock function, by the selection made by the user, setting is made such that a lock is not set only on the function of automatic payment of public utility bills and so forth according to this embodiment to keep this function alive. By doing so, if the user loses the portable terminal 5, the user can pay, by electronic money, an electricity rate and so forth which the user has to pay for the time being.

By the embodiment and the modified examples described above, the following advantages can be produced.

(1) According to this embodiment, it is possible to make payments of public utility bills and so forth by electronic money, the public utility bills and so forth that are created at regular intervals. Unlike an automatic deduction from a bank account, there is no need to go through a cumbersome procedure such as sending a document stamped with a seal.

Moreover, since electronic money can be used in more aspects of everyday life, the usefulness of electronic money is further improved. In particular, since various payments can be made only with the portable terminal 5, the necessity to prepare cash and go around with cash is further reduced.

(2) According to this embodiment, since the procedure of approval is provided before payment, it is possible to refuse payment which one does not need to pay.

(3) Since it is possible to receive notification about the presence of a payment debt and automatically complete payment, there is no possibility that one forgets payment as in the existing method.

(4) By adopting "deemed approval" in the processing in step 135, the user of the portable terminal 5 can proceed payment processing by "leaving" the procedure as it is and doing nothing when giving "approval" to the payment.

(5) According to Modified Example 1, since a plurality of approval procedures can be performed correctively, it is possible to reduce the burden of performing approval processing many times every month.

(6) According to Modified Example 2, if there is not enough balance, since automatic recharging is performed, it is possible to prevent payment from being left undone due to insufficient balance.

Moreover, by changing the setting of automatic recharging, it is possible to prevent the balance from becoming less than or equal to a lower limit amount after processing a payment debt.

(7) According to Modified Example 3, by selectively using the lock function of the portable terminal 5, it is possible to keep only the function of automatic payment of public utility bills and so forth alive without locking this function while suspending the function of electronic money and the function of automatic recharging. By doing so, even when the portable terminal 5 is lost, there is no need to suspend payments of public utility bills and so forth which one has to pay.

EXPLANATIONS OF LETTERS OR NUMERALS

1 electronic money system
2 electronic money server
3 credit company server
4 the Internet
5 portable terminal
7 base station
8 store terminal
10 terminal function section
11 interface section
12 IC chip
15 electronic money application
16 terminal communication section
17 value processing section
18 electronic money storing section
31 CPU
32 ROM
33 RAM
34 communication control section
35 storing section
36 program product storage section
37 data storage section
38 user DB
39 payment debt DB
40 log data DB
41 automatic recharging registration DB
81 member store

The invention claimed is:

1. An electronic money server in communication with a portable terminal, wherein the portable terminal stores in an integrated circuit (IC) chip a value of electronic money expressing an amount of money value as electronic data, and wherein the portable terminal has unique identification information, the electronic money server comprising:
at least one memory operable to store program code; and
at least one processor operable to read the program code and operate as instructed by the program code, the program code comprising:
payment debt creating code configured to cause at least one of said at least one processor to periodically create a payment debt that has to be paid in a predetermined period of time in a state in which the payment debt is related to the unique identification information of the portable terminal;

code configured to cause at least one of said at least one processor to record, in a payment debt recording storage, the payment debt;

payment debt presence or absence check accepting code configured to cause at least one of said at least one processor to accept an inquiry about a presence or an absence of the payment debt from the portable terminal;

payment approval requesting code configured to cause at least one of said at least one processor to, in response to the presence of the recorded payment debt being confirmed by searching the payment debt recording storage, transmit a request to the portable terminal to approve payment of the recorded payment debt in the predetermined period of time;

amount change information sending code configured to cause at least one of said at least one processor to, in response to a payment approval request issued by the payment approval requesting code and transmitted to the portable terminal, and after notification of approval is received from the portable terminal, send, to the portable terminal, amount change information indicating an amount of the recorded payment debt by which to decrease the value stored in the IC chip of the portable terminal, wherein the portable terminal decreases the value stored in the IC Chip by the amount of the recorded payment debt based on the amount change information; and payment debt clearing code configured to cause at least one of said at least one processor to clear the recorded payment debt in response to the amount change information sending code causing at least one of said at least one processor to send the amount change information by which the value stored in the IC chip is decreased by an amount of the payment debt, wherein when the value stored in the IC chip is determined to become a shortfall after decreasing the value by the amount of the recorded payment debt by the amount change information, the amount change information sending code is further configured to cause at least one of said at least one processor to send in advance, to the portable terminal, amount change information indicating an amount more than an amount corresponding to the shortfall to increase said value stored in the IC chip, and the program code further comprises remote lock code configured to cause at least one of said at least one processor to, in response to a successful user authentication, perform a remote lock function to lock a storage area of the IC chip in the portable terminal, wherein the remote lock function does not lock the IC chip from approving the payment of the payment debt periodically created in the predetermined period of time.

2. The electronic money server according to claim 1, wherein in response to the payment approval request transmitted to the portable terminal by the payment approval requesting code, under a condition that notification of disapproval is not received from the portable terminal, approval is deemed to be given when no response is sent back.

3. The electronic money server according to claim 2, wherein when said inquiry is accepted by the payment debt presence or absence check accepting code and the recorded payment debt is present, the payment approval requesting code configured to cause at least one of said at least one processor to request approval for the payment.

4. The electronic money server according to claim 3, further comprising:

the payment approval requesting code is further configured to cause at least one of said at least one processor requesting to approve payment for a plurality of payment debts based on constant requirements in a lump.

5. The electronic money server according to claim 4, further comprising:

payment debt creation demand accepting code configured to cause at least one of said at least one processor to receive a demand of payment debt creation, amount of money of the payment debt and the unique identification information from the portable terminal, wherein after the payment debt creation demand accepting code causes at least one of said at least one processor to receive the demand of the payment debt creation from the portable terminal, the payment debt creating code configured to cause at least one of said at least one processor to create the payment debt.

6. The electronic money server according to claim 3, further comprising:

payment debt creation demand accepting code configured to cause at least one of said at least one processor to receive a demand of payment debt creation, amount of money of the payment debt and the unique identification information from the portable terminal, wherein after the payment debt creation demand accepting code causes at least one of said at least one processor to receive the demand of the payment debt creation from the portable terminal, the payment debt creating code configured to cause at least one of said at least one processor to create the payment debt.

7. The electronic money server according to claim 2, further comprising:

the payment approval requesting code is further configured to cause at least one of said at least one processor requesting to approve payment for a plurality of payment debts based on constant requirements in a lump.

8. The electronic money server according to claim 7, further comprising:

payment debt creation demand accepting code configured to cause at least one of said at least one processor to receive a demand of payment debt creation, amount of money of the payment debt and the unique identification information from the portable terminal, wherein after the payment debt creation demand accepting code causes at least one of said at least one processor to receive the demand of the payment debt creation from the portable terminal, the payment debt creating code configured to cause at least one of said at least one processor to create the payment debt.

9. The electronic money server according to claim 2, further comprising:

payment debt creation demand accepting code configured to cause at least one of said at least one processor to receive a demand of payment debt creation, amount of money of the payment debt and the unique identification information from the portable terminal, wherein
after the payment debt creation demand accepting code causes at least one of said at least one processor to receive the demand of the payment debt creation from the portable terminal, the payment debt creating code configured to cause at least one of said at least one processor to create the payment debt.

10. The electronic money server according to claim 1, wherein
when said inquiry is accepted by the payment debt presence or absence check accepting code by searching the payment debt recording storage and the recorded payment debt is present, the payment approval requesting code configured to cause at least one of said at least one processor to request approval for the payment.

11. The electronic money server according to claim 10, further comprising:
the payment approval requesting code is further configured to cause at least one of said at least one processor requesting to approve payment for a plurality of payment debts based on constant requirements in a lump.

12. The electronic money server according to claim 11, further comprising:
payment debt creation demand accepting code configured to cause at least one of said at least one processor to receive a demand of payment debt creation, amount of money of the payment debt and the unique identification information from the portable terminal,
wherein
after the payment debt creation demand accepting code causes at least one of said at least one processor to receive the demand of the payment debt creation from the portable terminal, the payment debt creating code configured to cause at least one of said at least one processor to create the payment debt.

13. The electronic money server according to claim 10, further comprising:
payment debt creation demand accepting code configured to cause at least one of said at least one processor to receive a demand of payment debt creation, amount of money of the payment debt and the unique identification information from the portable terminal,
wherein
after the payment debt creation demand accepting code causes at least one of said at least one processor to receive the demand of the payment debt creation from the portable terminal, the payment debt creating code configured to cause at least one of said at least one processor to create the payment debt.

14. The electronic money server according to claim 1, further comprising:
the payment approval requesting code is further configured to cause at least one of said at least one processor requesting to approve payment for a plurality of payment debts based on constant requirements in a lump.

15. The electronic money server according to claim 14, further comprising:
payment debt creation demand accepting code configured to cause at least one of said at least one processor to receive a demand of payment debt creation, amount of money of the payment debt and the unique identification information from the portable terminal,
wherein
after the payment debt creation demand accepting code causes at least one of said at least one processor to receive the demand of the payment debt creation from the portable terminal, the payment debt creating code configured to cause at least one of said at least one processor to create the payment debt.

16. The electronic money server according to claim 1, further comprising:
payment debt creation demand accepting code configured to cause at least one of said at least one processor to receive a demand of payment debt creation, amount of money of the payment debt and the unique identification information from the portable terminal,
wherein
after the payment debt creation demand accepting code causes at least one of said at least one processor to receive the demand of the payment debt creation from the portable terminal, the payment debt creating code configured to cause at least one of said at least one processor to create the payment debt.

17. The electronic money server according to claim 1, further comprising:
payment debt creation demand accepting code configured to cause at least one of said at least one processor to receive a demand of payment debt creation, amount of money of the payment debt and the unique identification information from the portable terminal,
wherein
after the payment debt creation demand accepting code causes at least one of said at least one processor to receive the demand of the payment debt creation from the portable terminal, the payment debt creating code configured to cause at least one of said at least one processor to create the payment debt.

18. An electronic money processing method in an electronic money server in communication with a portable terminal, wherein the portable terminal stores in an integrated circuit (IC) chip value of electronic money expressing an amount of money value as electronic data, and wherein the portable terminal has unique identification information, the method comprising:
periodically creating, by the electronic money server, a payment debt that has to be paid in a predetermined period of time in a state in which the payment debt is related to the unique identification information of the portable terminal;
recording, by the electronic money server and via a payment debt recording storage, the payment debt;
accepting, by the electronic money server and from the portable terminal, an inquiry about a presence or an absence of the payment debt;
in response to the presence of the recorded payment debt being confirmed by searching the payment debt recording storage, transmitting, by the electronic money server, a request to the portable terminal to approve payment of the recorded payment debt in the predetermined period of time;
in response to a payment approval request issued and transmitted to the portable terminal, and after notification of approval is received from the portable terminal, sending, by the electronic money server and to the portable terminal, amount change information indicating an amount of the recorded payment debt by which to decrease the value stored in the IC chip of the portable terminal, wherein the portable terminal decreases the value stored in the IC Chip by the amount of the recorded payment debt based on the amount change information;
clearing, by the electronic money server, the recorded payment debt in response to transmission of the amount change information by which the value stored in the IC chip is decreased by an amount of the payment debt;

when the value stored in the IC chip is determined to become a shortfall after decreasing the value by the amount of the recorded payment debt by the amount change information, sending in advance, by the electronic money server and to the portable terminal, amount change information indicating an amount more than an amount corresponding to the shortfall to increase said value stored in the IC chip, and in response to a successful user authentication, performing, by the electronic money server, a remote lock function to lock a storage area of the IC chip in the portable terminal, wherein the remote lock function does not lock the IC chip from approving the payment of the payment debt periodically created in the predetermined period of time.

19. A non-transitory computer-readable recording medium on which an electronic money processing program product is recorded, in an electronic money server in communication with a portable terminal, wherein the portable terminal stores in an integrated circuit (IC) chip value of electronic money expressing an amount of money value as electronic data, and wherein the portable terminal has unique identification information, the electronic money processing program product causing the electronic money server to:

periodically create a payment debt that has to be paid in a predetermined period of time in a state in which the payment debt is related to the unique identification information of the portable terminal;

record, via a payment debt recording storage, the payment debt;

accept, from the portable terminal, an inquiry about a presence or an absence of the recorded payment debt;

in response to the presence of the recorded payment debt being confirmed by searching the payment debt recording storage, transmit a request to the portable terminal to approve payment of the recorded payment debt in the predetermined period of time;

in response to a payment approval request issued and transmitted to the portable terminal, and after notification of approval is received from the portable terminal, send, to the portable terminal, amount change information indicating an amount of the recorded payment debt by which to decrease the value stored in the IC chip of the portable terminal, wherein the portable terminal decreases the value stored in the IC Chip by the amount of the recorded payment debt based on the amount change information;

clear the recorded payment debt in response to transmission of the amount change information by which the value stored in the IC chip is decreased by an amount of the payment debt;

when the value stored in the IC chip is determined to become a shortfall after decreasing the value by the amount of the recorded payment debt by the amount change information, send in advance, to the portable terminal, amount change information indicating an amount more than an amount corresponding to the shortfall to increase said value stored in the IC chip; and in response to a successful user authentication, perform a remote lock function to lock a storage area of the IC chip in the portable terminal, wherein the remote lock function does not lock the IC chip from approving the payment of the payment debt periodically created in the predetermined period of time.

* * * * *